Dec. 7, 1948.     J. D. KENNELLY     2,455,497
OSCILLATING WARNING LIGHT FOR VEHICLES
Filed Nov. 2, 1945
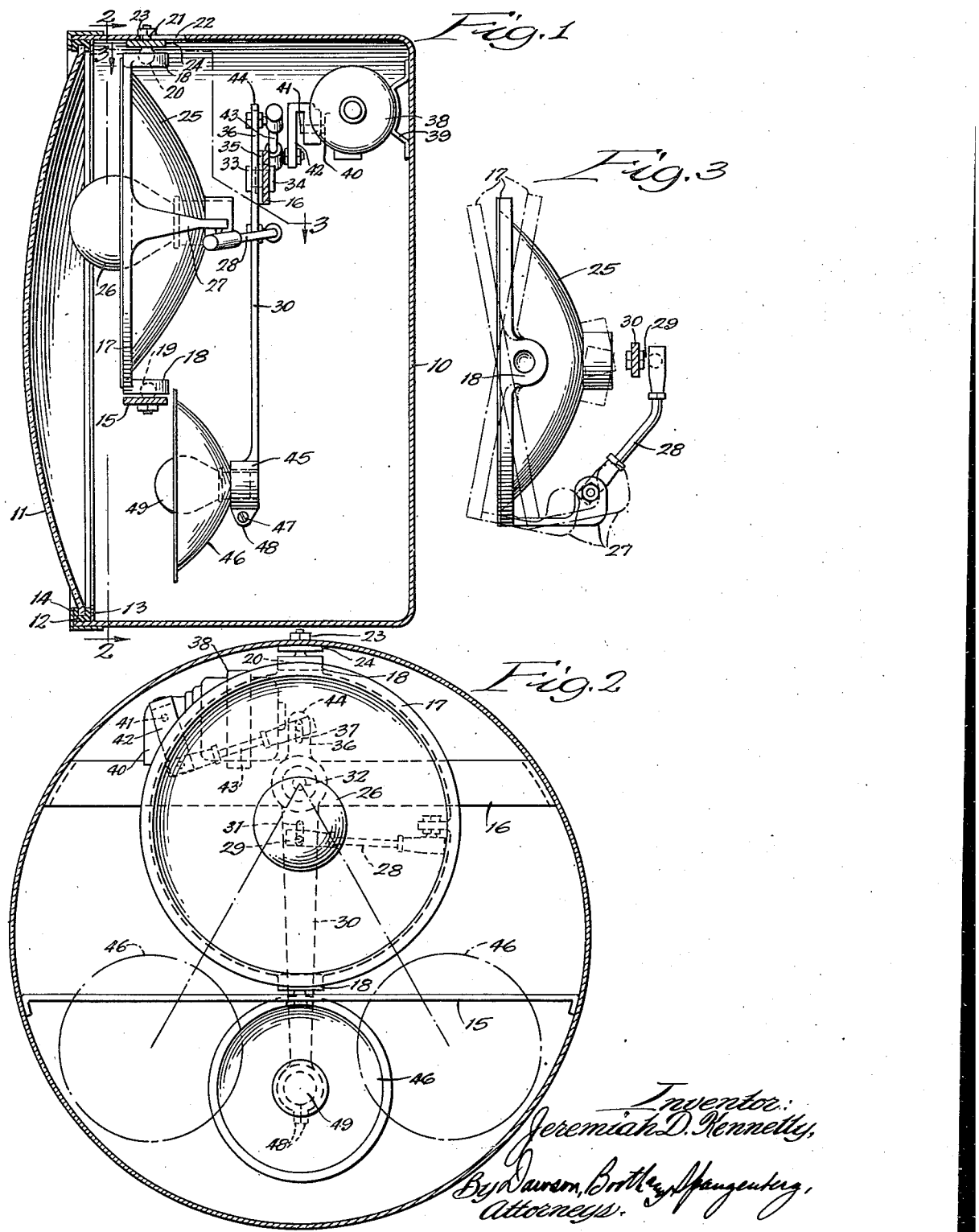

UNITED STATES PATENT OFFICE 2,455,497

OSCILLATING WARNING LIGHT FOR VEHICLES

Jeremiah D. Kennelly, Oak Park, Ill.

Application November 2, 1945, Serial No. 626,358

3 Claims. (Cl. 177—329)

This invention relates to light-signal apparatus. The invention is particularly useful in connection with light-signal apparatus for locomotives, railway trains, automobile trucks, and further as a warning light installation for strategic locations.

An object of the invention is to provide an improved light-signal apparatus provided with unusual means for attracting attention and effectively signalling a warning. A further object is to provide an apparatus of simple construction which may be operated with a minimum of power and which provides a unique means for signalling by light beams. Other specific objects and advantages will appear as the specification proceeds.

The invention is illustrated, in a preferred embodiment, by the accompanying drawing, in which—

Figure 1 is a vertical sectional view of apparatus embodying my invention; Fig. 2, a sectional view, the section being taken as indicated at line 2—2 of Fig. 1; and Fig. 3, a detail sectional view, the section being taken as indicated at line 3—3 of Fig. 1.

In the illustration given, 10 designates a housing which may be formed of sheet metal and of a generally cylindrical shape. The housing is open at its forward end, and a lens 11 is secured within a rubber ring 12 against a flange 13 welded to the housing 10. An outer angle iron 14 locks the ring 12 in position. The member 14 may be secured to the housing 10 by spot welding or by any other suitable means.

Within the housing 10, a supporting cross strip 15 is secured in position by welding or other suitable means, as shown more clearly in Figs. 1 and 2. A second supporting strip 16 is also secured as a supporting strap across the interior of housing 10.

A ring frame member 17 is supported upon vertically-spaced pivots so as to oscillate from side to side transversely of the casing. The member 17 is provided with flanges 18 which are provided with sockets receiving the ball members 19 and 20. The ball member 19 is carried by the transverse strap 15, as shown more clearly in Fig. 1. The upper ball member 20 is carried by the bolt 21 which extends through an opening 22 in the housing 10. A nut 23 draws the flange 24 tightly against the inner side of housing 10. By means of the two members 19 and 20, the ring frame 17 is thus secured in position and permitted to rotate from left to right or transversely of the housing. A reflector 25 is supported within the ring 17, and a light bulb 26 supported within the reflector in the usual manner.

The ring 17 is provided on one side with a rearwardly-extending arm 27 which is pivotally connected to an actuating arm 28. The arm 28 is connected by means of a pin 29 to a pendulum arm 30. The pendulum arm 30 is provided with an elongated slot 31 through which the pin 29 extends.

The pendulum arm 30 is pivotally supported upon the metal strap 16 at 32 by means of a pin having flanged ends 33 and 34. If desired, the pendulum arm may be provided with a wear ring 35 adapted to rest against the vertical strap 16. The pendulum arm is preferably provided with an integral extension 36 having a slot 37 therein.

Any suitable means for operating the pendulum arm may be employed. In the illustration given, a motor 38 is supported by bracket 39 welded to the casing 10. The motor 38 drives through reduction gears 40 and shaft 41 upon which is mounted a lever arm 42. The lever arm 42 describes a relatively wide circle around the shaft 41 and moves a rod 43, which is connected to the extension 36 by means of pin 44, through relatively wide strokes from right to left. By this means, the pendulum arm is swung well to the right and to the left as shaft 41 rotates.

The bottom portion of arm 30 provides a collar 45 adapted to receive the hub of a reflector 46. The collar 45 is clamped around the hub by means of a screw 47 passing through spaced flanges 48. A light bulb 49 is secured within the socket in the usual manner, and wiring connects both light bulb 49 and light bulb 26, as well as motor 38, with a suitable source of current.

In the operation of the structure, the motor 38 is set into operation and drives through reduction gears 40 the drive shaft 41. The arm 42, which is fixed upon shaft 41, makes a wide arcuate stroke around the shaft 41 and swings the connecting bar or rod 43 laterally through relatively long movements. This causes the extension 36 of pendulum arm 30 to be swung laterally, and thus the suspended light 49 is given a long arcuate swing from one side to the other. At the same time, the connecting means between the pendulum arm 30 and the integral arm 27 of frame 17 oscillates the frame 17 and light 26 from side to side as the pendulum swings, the oscillation of the light 26 being in a direction opposite to the swing of the lower light 49. In other words, as the lower light swings to the right, the upper light 26 oscillates to the left, and vice versa, the two lights, however, being focused together when the pendulum arm rotates substantially in a vertical position. Both lights may be colored red or their rays caused to pass through a lens 11 which may be colored red, or the two lights may be of different colors, as desired, and their differently-colored beams may pass through a plain or transparent plate 11.

By employing a pendulum arm, the operation is given a rhythmic or even stroke and the two lights operate in a timed relation. With the structure shown, there is a minimum of burden or load placed upon the motor, and the warning operations can be carried on for extensive intervals without consumption of much current. While the light may be formed in a relatively small housing, the wide sweep of the pendulum arm around the upper light gives the signal device the signalling or warning effect of a much larger structure, and attention is attracted to it from considerable distances. The transversely-rotating upper light 26, which blends with the pendulum light when the arm 30 is in vertical position and moves in opposite directions at other times, forms a sharply-contrasting beam which accentuates and calls attention to the swinging pendulum light 49.

With the construction shown, the upper light 26 and its reflector 25 may be swung to a tilted position vertically by moving the adjustment bolt 21 rearwardly through the slot 22, as shown more clearly in Fig. 1. At times, it is desired to throw the illumination at higher angles, particularly when the light is used upon locomotives, and the construction shown permits the reflector 25 and its associated parts to be tilted upwardly while supported for rotation upon the balls 19 and 20.

While in the foregoing specification, I have set forth certain specific details for the purpose of illustration, it will be understood that such details may be varied widely by those skilled in the art without departing from the spirit of my invention.

I claim:

1. In light-signal apparatus, a casing open at one end, a reflector mounted in said frame for lateral movement, a light bulb supported in said reflector, a pendulum arm suspended from the top portion of said casing, a motor-driven means for swinging said pendulum arm, a reflector carried by the lower end of said pendulum arm and facing toward the open end of said casing, a light bulb supported within said reflector, means for supplying current to said light bulbs and to said motor, and a connecting member between said pendulum arm and said first mentioned reflector to produce simultaneous movement of said reflector with the pendulum arm.

2. In light-signal apparatus, a casing open at one end, a reflector mounted in said casing for lateral movement, a light bulb supported in front of said reflector, a pendulum arm suspended from the top portion of said casing and extending below said reflector, a motor-driven means for swinging said pendulum arm, a second reflector carried by the lower end of said pendulum arm and facing toward the open end of said casing, a light bulb supported within said second reflector, means for supplying current to said light bulbs and to said motor, and connecting means between said pendulum arm and said first-mentioned reflector to produce simultaneous movement of said first-mentioned reflector with the pendulum arm.

3. In light-signal apparatus, a casing open at one end, a reflector mounted in said casing for lateral movement, a light bulb in front of said reflector, a pendulum arm suspended from the top portion of said casing, a motor-driven means for swinging said pendulum arm, a second reflector carried by the lower end of said pendulum arm and facing toward the open end of said casing, said pendulum arm supporting said second reflector for movement in an arcuate path around the periphery of said first-mentioned reflector, a light bulb within said second reflector, means for supplying current to said light bulbs and to said motor, and a connecting member between said pendulum arm and said first-mentioned reflector to produce simultaneous movement of said reflector with the pendulum arm.

JEREMIAH D. KENNELLY.

REFERENCES CITED

The following references are of record in the file of this patent:

UNITED STATES PATENTS

| Number | Name | Date |
|---|---|---|
| 807,940 | Johnson | Dec. 19, 1905 |
| 1,166,285 | Wages | Dec. 28, 1915 |
| 1,269,035 | Workman | June 11, 1918 |
| 1,317,268 | Cole | Sept. 30, 1919 |
| 1,471,355 | Post | Oct. 23, 1923 |
| 1,792,250 | Signor | Feb. 10, 1931 |
| 2,002,332 | Signor | May 21, 1935 |